United States Patent
Kim et al.

(10) Patent No.: US 10,571,353 B2
(45) Date of Patent: *Feb. 25, 2020

(54) COLLISION PRESSURE SENSOR HAVING AN ELASTIC PRESSING UNIT

(71) Applicants: HYUNDAI MOBIS CO., LTD., Seoul (KR); KOREA ELECTRIC TERMINAL CO., LTD., Incheon (KR)

(72) Inventors: Sangdo Kim, Yongin-si (KR); Hyunseok Yun, Seoul (KR)

(73) Assignees: HYUNDAI MOBIS CO., LTD., Seoul (KR); KOREA ELECTRIC TERMINAL CO., LTD., Incheon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/901,436

(22) Filed: Feb. 21, 2018

(65) Prior Publication Data

US 2018/0246001 A1 Aug. 30, 2018

(30) Foreign Application Priority Data

Feb. 27, 2017 (KR) .......................... 10-2017-0025475

(51) Int. Cl.
*G01L 19/14* (2006.01)
*B60R 21/01* (2006.01)

(52) U.S. Cl.
CPC .......... *G01L 19/147* (2013.01); *G01L 19/143* (2013.01); *B60R 2021/01013* (2013.01)

(58) Field of Classification Search
CPC .. B60R 2021/01013; B60R 2021/01006; B60R 21/0136; G01L 19/147; G01L 19/146; G01L 19/143; G01D 11/245
See application file for complete search history.

(56) References Cited

U.S. PATENT DOCUMENTS

| | | | | |
|---|---|---|---|---|
| 4,656,454 A | * | 4/1987 | Rosenberger | G01L 19/0084 29/621.1 |
| 4,845,322 A | * | 7/1989 | Iwakiri | H01H 35/34 200/81 R |
| 5,048,181 A | * | 9/1991 | Grider | G01L 9/0055 29/592.1 |
| 5,184,107 A | * | 2/1993 | Maurer | G01L 19/0084 29/621.1 |
| 5,834,652 A | * | 11/1998 | Koshimizu | G01L 19/003 73/756 |

(Continued)

*Primary Examiner* — Lisa M Caputo
*Assistant Examiner* — Tran M. Tran
(74) *Attorney, Agent, or Firm* — Knobbe Martens Olson & Bear LLP

(57) ABSTRACT

A pressure sensing apparatus for a vehicle may include: a sensor element configured to measure a change in air pressure by a vehicle collision; a housing unit into which the sensor element is seated, and including a terminal unit electrically coupled to the sensor element, the housing unit being fixed to a vehicle body; a cover unit removably installed on the housing unit; and an elastic pressing unit including a first end coupled to the cover unit, and a second end protruding toward the sensor element and pressing the sensor element, the elastic pressing unit being made of elastically deformable material. An area of a pressing surface of the elastic pressing unit that faces the sensor element may be equal to or less than an area of a surface of the sensor element that faces the pressing surface.

8 Claims, 10 Drawing Sheets

(56) References Cited

U.S. PATENT DOCUMENTS

| | | | | |
|---|---|---|---|---|
| 6,365,424 B1* | 4/2002 | Bauer | G01D 11/245 | 257/690 |
| 7,098,778 B1* | 8/2006 | Zoratti | B60R 21/013 | 280/728.1 |
| 7,208,943 B2* | 4/2007 | Godoy | G01D 5/12 | 174/521 |
| 7,380,458 B1* | 6/2008 | Date | G01D 11/245 | 180/274 |
| 8,164,007 B2* | 4/2012 | Speldrich | B29C 45/14336 | 174/541 |
| 8,276,455 B2* | 10/2012 | Watanabe | G01L 19/0654 | 73/700 |
| 8,468,895 B2* | 6/2013 | Colombo | G01L 19/0038 | 73/715 |
| 8,621,925 B2* | 1/2014 | Dietrich | B29C 45/14467 | 73/431 |
| 8,701,476 B2* | 4/2014 | Prado | G01D 11/245 | 73/114.31 |
| 8,972,116 B2* | 3/2015 | Leach | B60R 19/02 | 701/45 |
| 9,260,071 B2* | 2/2016 | Murray, Jr. | B60R 21/01 | |
| 9,360,348 B2* | 6/2016 | Henzler | G01D 11/245 | |
| 9,891,081 B2* | 2/2018 | Henzler | G01L 19/143 | |
| 10,161,769 B2* | 12/2018 | Woernle | G01D 11/245 | |
| 2018/0090868 A1* | 3/2018 | Forwerck | G01L 19/0069 | |

* cited by examiner

COLLISION PRESSURE SENSOR HAVING AN ELASTIC PRESSING UNIT

CROSS-REFERENCES TO RELATED APPLICATIONS

The present application claims priority to Korean application number 10-2017-0025475, filed on Feb. 27, 2017, which is incorporated by reference in its entirety.

BACKGROUND OF THE INVENTION

The present invention relates to a pressure sensing apparatus for a vehicle, and more particularly, to a pressure sensing apparatus for a vehicle in which a sensor element may be stably installed without using a separate PCB.

In general, vehicles may be provided with various safety devices for protecting occupants when a vehicle collision occurs. An airbag device which is inflated by gas to protect an occupant with cushioning force is a representative example of such safety devices.

An airbag of a vehicle is operated in conjunction with a collision sensor. When a vehicle collision occurs, an output signal of the collision sensor is inputted to an airbag control unit (ACU), and the airbag is deployed by the ACU.

Recently, a pressure collision sensor is used to improve the speed at which an airbag is deployed during a vehicle collision. The pressure collision sensor is a pressure sensor and outputs a signal when a shock wave, which is impact pressure air, is transmitted to a sensor body when a vehicle collision occurs.

The pressure sensor installed in a vehicle measures the rate of change in air pressure only in the case where the air pressure changes when a vehicle collision occurs, rather than measuring the air pressure under normal conditions.

The pressure sensor is connected to a PCB. The PCB is fixed in a housing that is installed enclosing the pressure sensor. To fix the PCB in the housing, installation of a separate structure is required, and a separate assembly process for fixing the PCB is also added. In detail, the PCB may be fixed in the housing through a soldering or pressing process, and be fixed in the housing by separately bolting or bonding.

In the conventional techniques, when a sensor element is installed as a pressure sensor for measuring the air pressure, a PCB connected with the sensor element should be additionally installed. Thus, there is a problem in that the number of assembly processes increases. Therefore, there is a need to improve this configuration.

SUMMARY OF THE INVENTION

Embodiments of the present invention are directed to a pressure sensing apparatus for a vehicle in which a sensor element is stably installed without a PCB.

In one embodiment, a pressure sensing apparatus for a vehicle may include: a sensor element configured to measure a change in air pressure by a vehicle collision; a housing unit in which the sensor element is seated, and including a terminal unit electrically coupled to the sensor element, the housing unit being fixed to a vehicle body; a cover unit removably installed on the housing unit; and an elastic pressing unit including a first end coupled to the cover unit, and a second end protruding toward the sensor element and pressing the sensor element, the elastic pressing unit being made of elastically deformable material. An area of a pressing surface of the elastic pressing unit that faces the sensor element may be equal to or less than an area of a surface of the sensor element that faces the pressing surface.

The housing unit may include: a housing body including a mounting depression in which the sensor element is seated; a vehicle body mounting part protruding from each of opposite sides of the housing body and fixed to the vehicle body; and a connector extending from the housing body and including therein a connector terminal coupled to the terminal unit.

The housing body may further include a guide rib protruding into the mounting depression and configured to guide movement of the sensor element coming into contact with the terminal unit.

The housing unit may further include a protrusion-shaped stopper protruding from the housing body facing the cover unit, and configured to support the cover unit.

The vehicle body mounting part may be integrated with the connector.

The cover unit may include: a cover body coupled with the elastic pressing unit; a hook extending from the cover body and coupled to the housing unit in a fitting manner; and a protruding duct extending outward from the cover body and forming a path through which air moves. Air pressure moving through the protruding duct may move to the sensor element through a hole of the cover body and a hole of the elastic pressing unit.

The pressure sensing apparatus may further include an inner elastic part forming a band-shaped flange around a periphery of the elastic pressing unit, and formed of an elastic body fixed to an inner surface of the cover body.

A sealing protrusion protruding along a perimeter of the mounting depression may come into contact with the inner elastic part.

The pressure sensing apparatus may further include an outer elastic part forming a band-shaped flange around a periphery of the protruding duct, and formed of an elastic body fixed to an outer surface of the cover body.

The terminal unit may include a round terminal hemispherically protruding toward the sensor element and coming into contact with the sensor element.

In the pressure sensing apparatus for the vehicle in accordance with the present invention, when a cover unit is coupled to a housing unit, an elastic pressing unit presses a sensor element. Therefore, the sensor element may be stably installed without a separate PCB, whereby the number of production processes may be reduced.

DESCRIPTION OF SPECIFIC EMBODIMENTS

Hereinafter, an embodiment of a pressure sensing apparatus for a vehicle in accordance with the present invention will be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
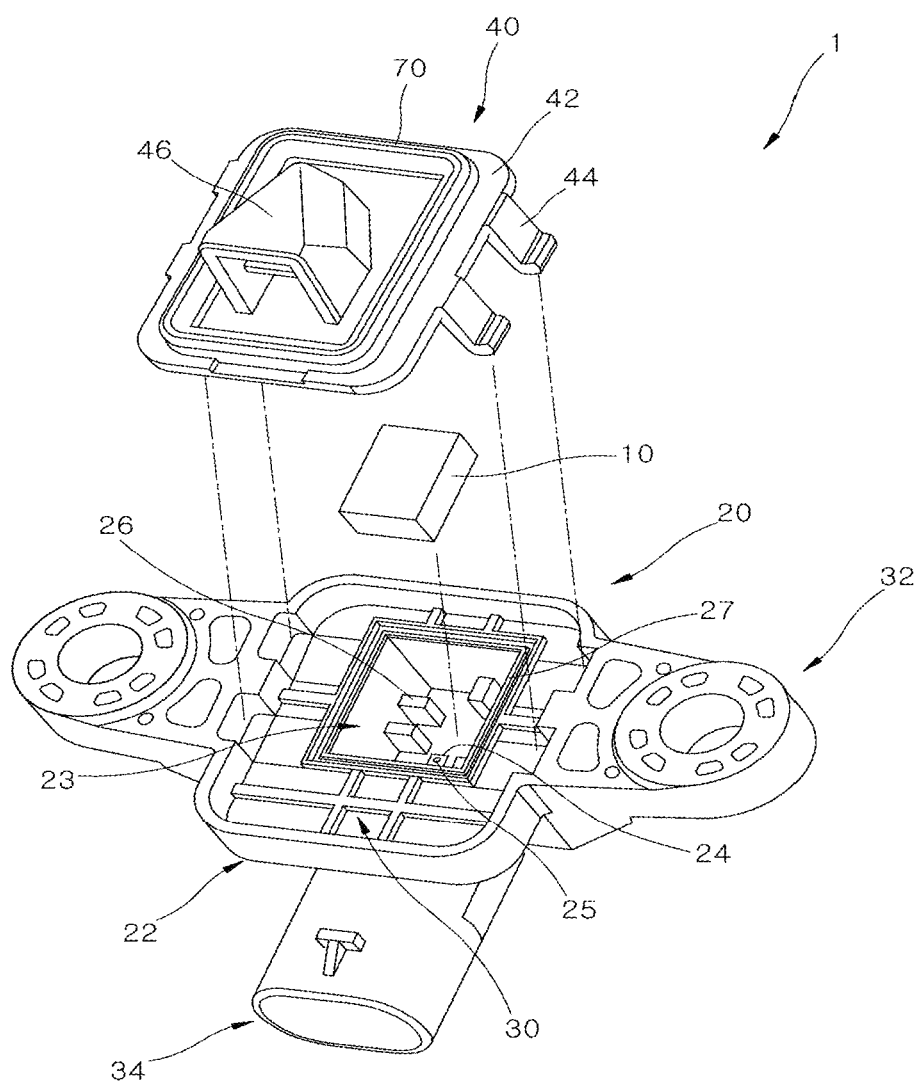
FIG. 1 is an exploded perspective view schematically illustrating a structure of a pressure sensing apparatus for a vehicle in accordance with an embodiment of the present invention.
Figure 2:
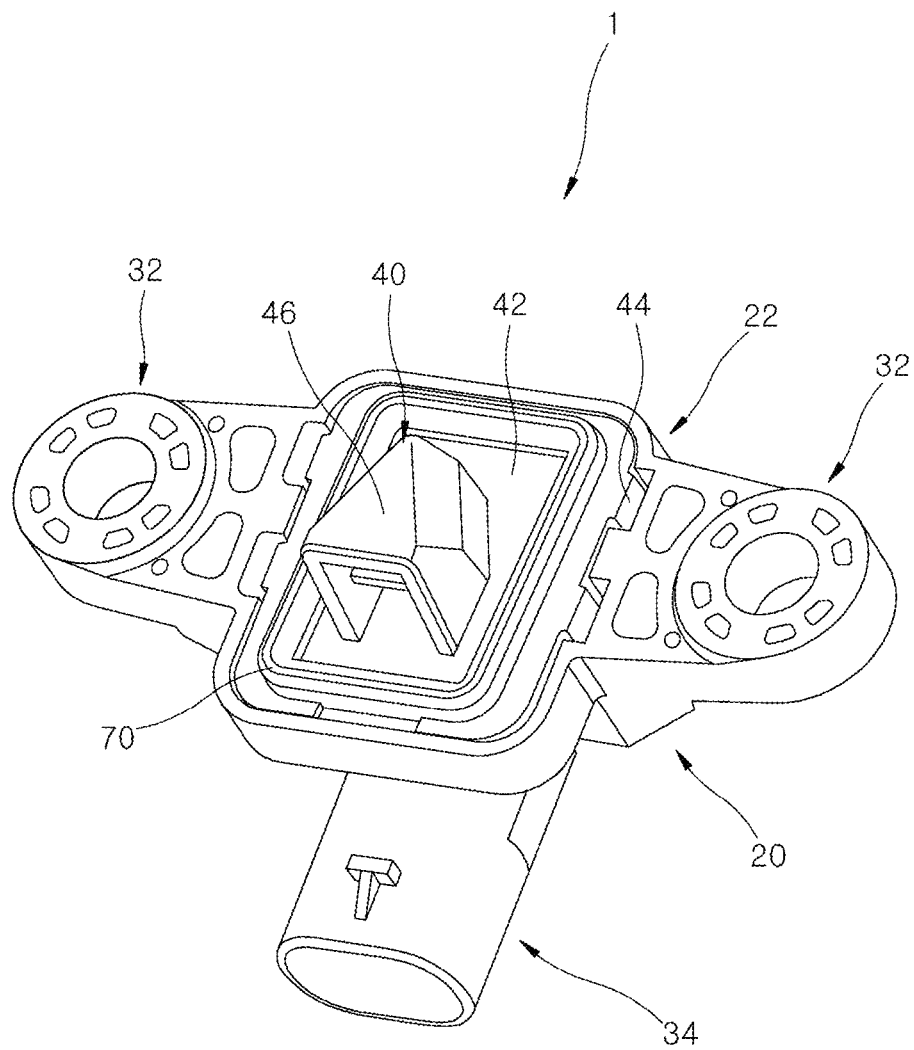
FIG. 2 is a perspective view illustrating the external shape of the pressure sensing apparatus in accordance with the embodiment of the present invention.
Figure 3:
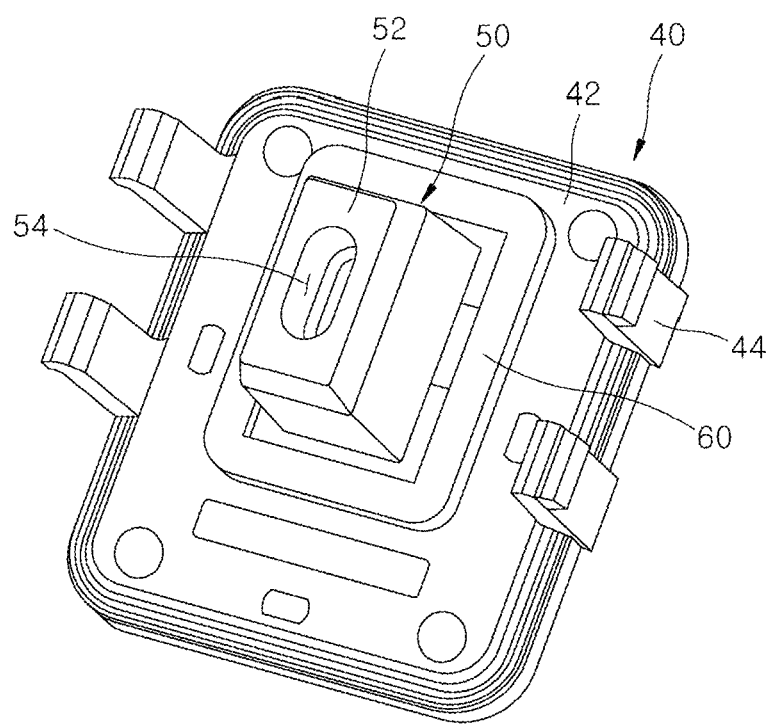
FIG. 3 is a perspective view illustrating an elastic pressing unit installed in a cover unit in accordance with the embodiment of the present invention.
Figure 4:
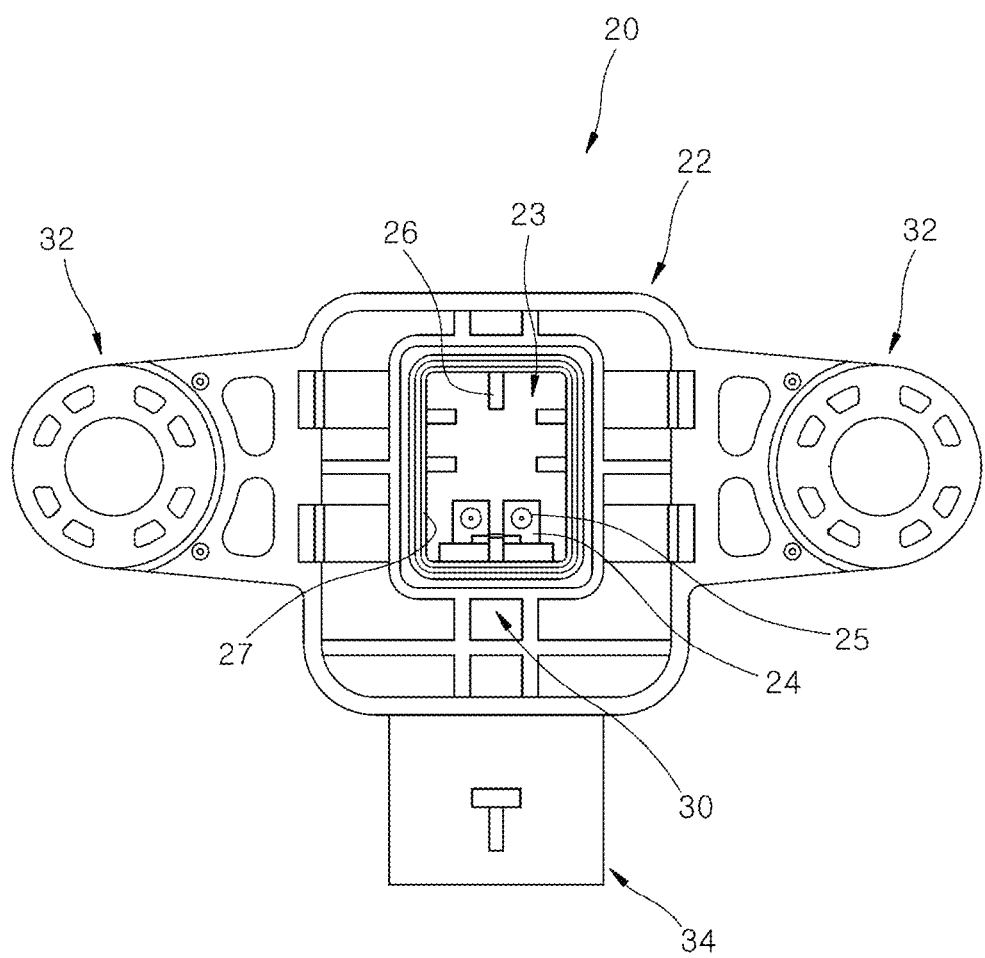
FIG. 4 is a plan view illustrating a housing unit in accordance with the embodiment of the present invention.
Figure 5:
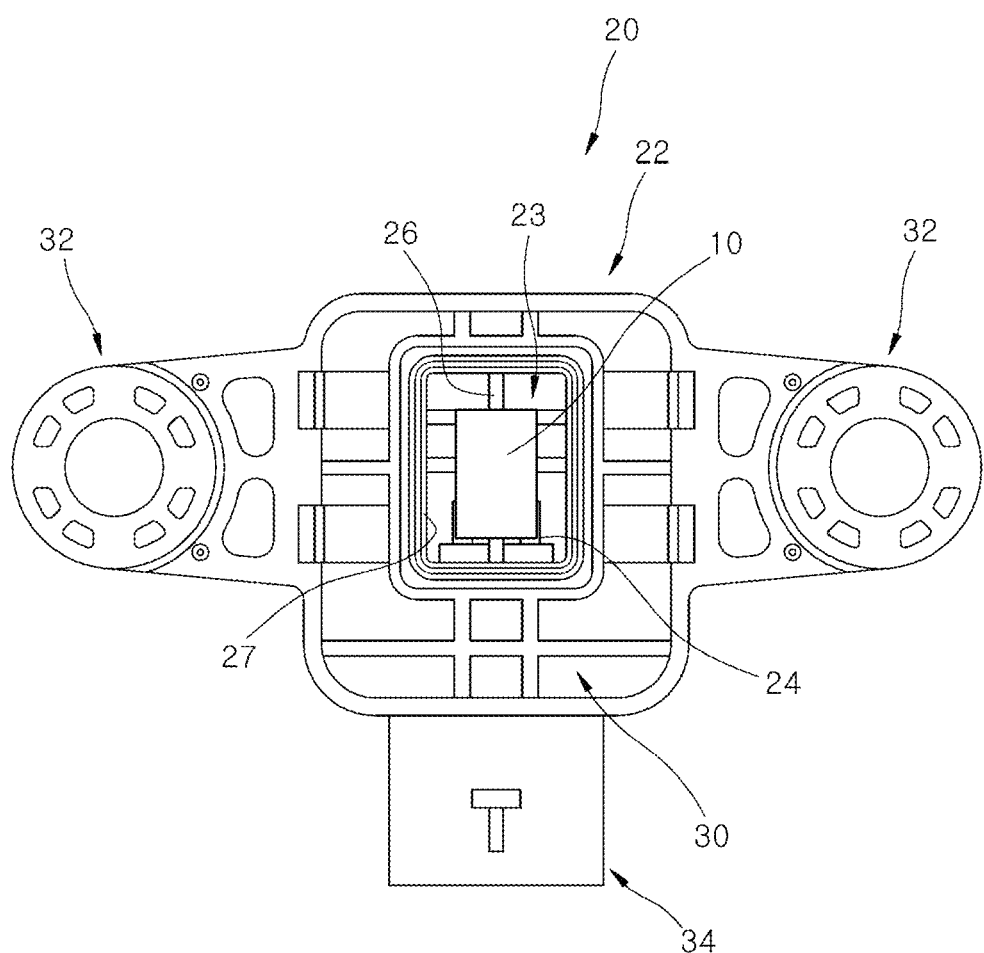
FIG. 5 is a plan view illustrating a sensor element installed in the housing unit in accordance with the embodiment of the present invention.
Figure 6:
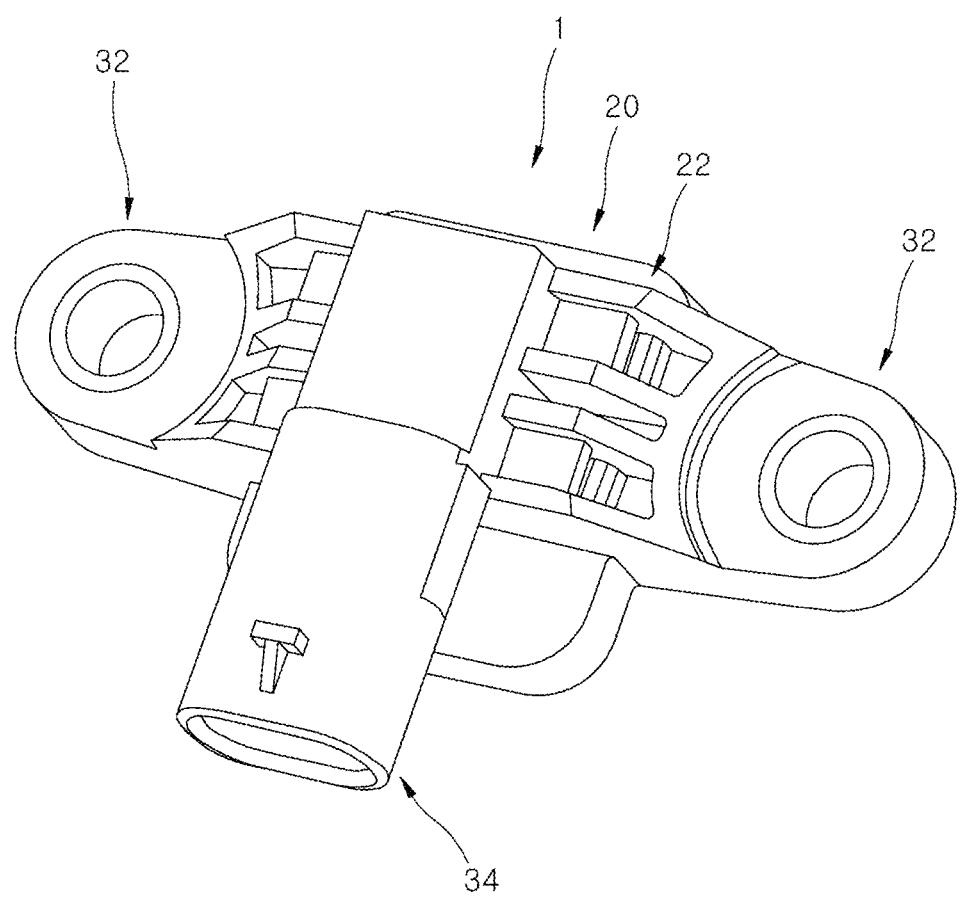
FIG. 6 is a perspective view illustrating a rear side of the pressure sensing apparatus in accordance with the embodiment of the present invention.
Figure 7:
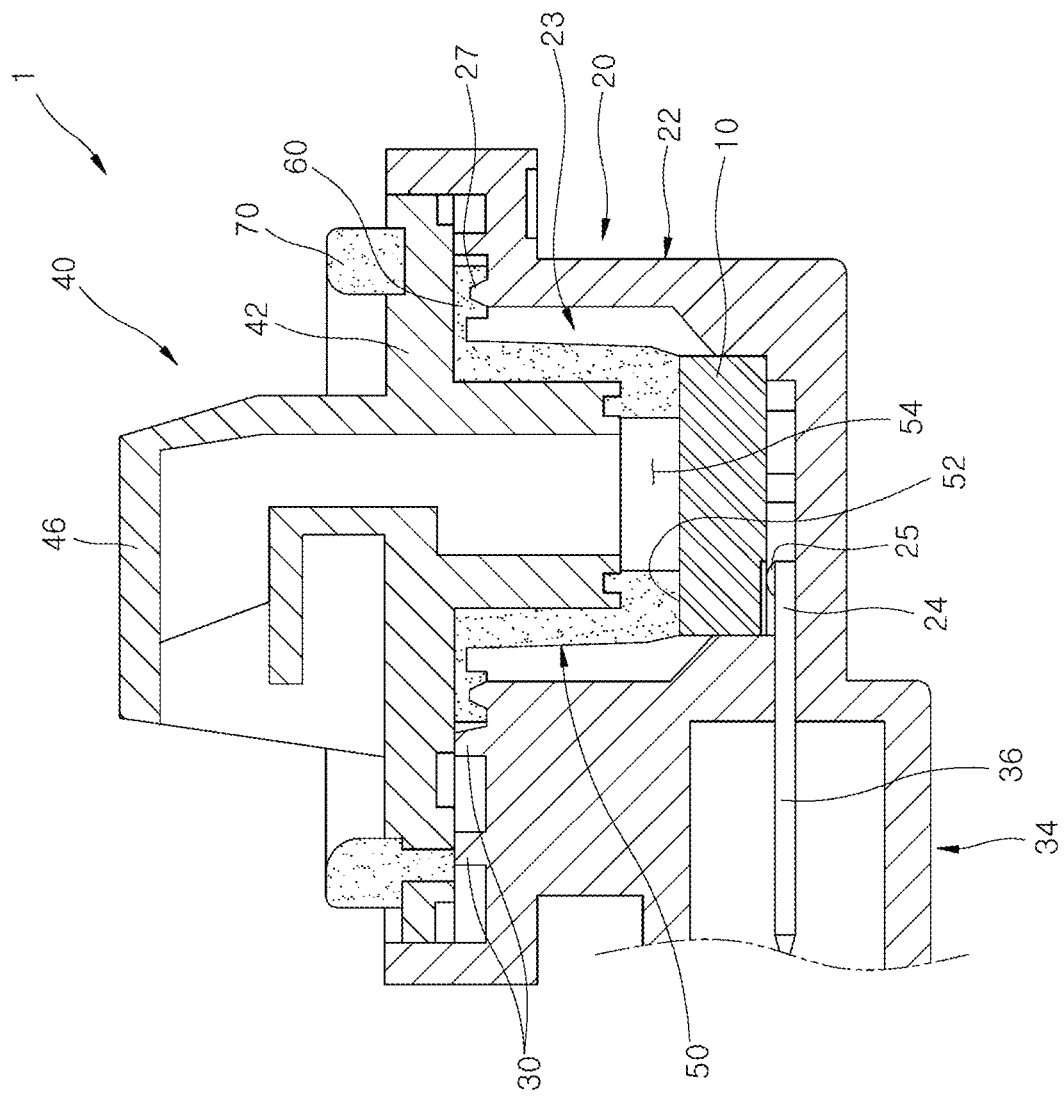
FIGS. 7 and 8 are sectional views schematically illustrating the pressure sensing apparatus in accordance with the embodiment of the present invention.
Figure 8:
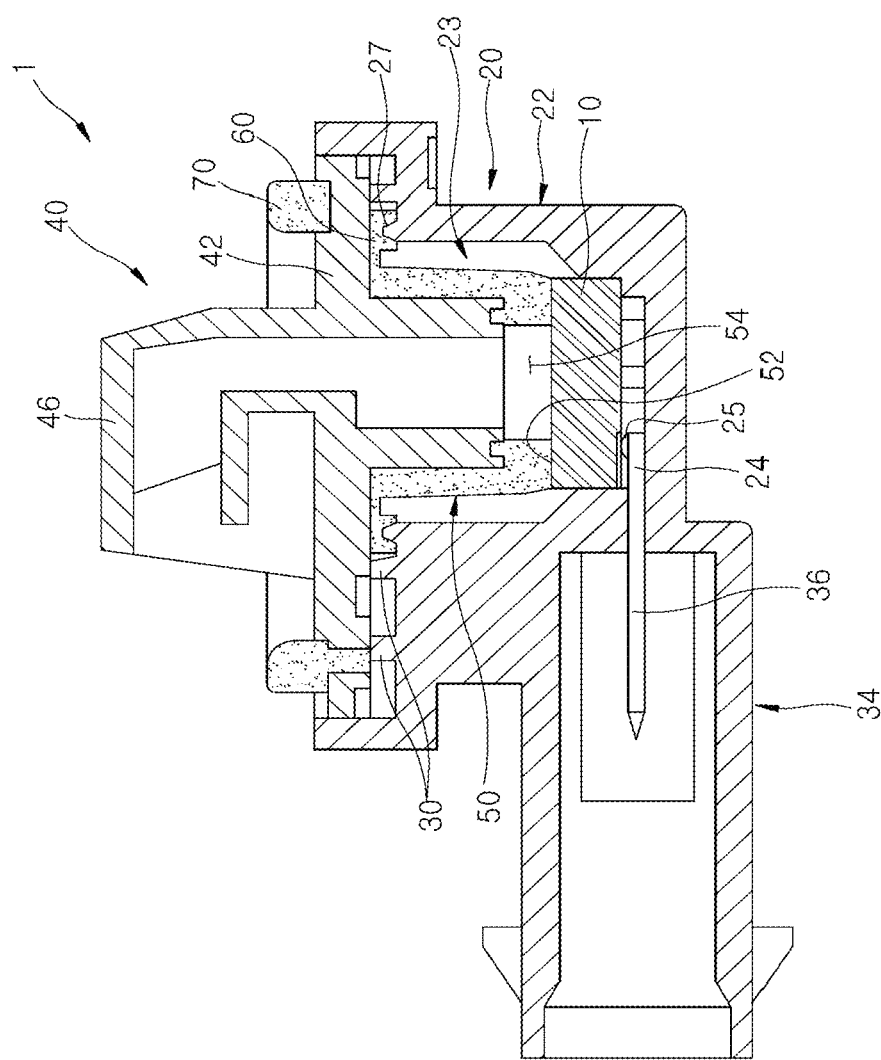
Figure 9:
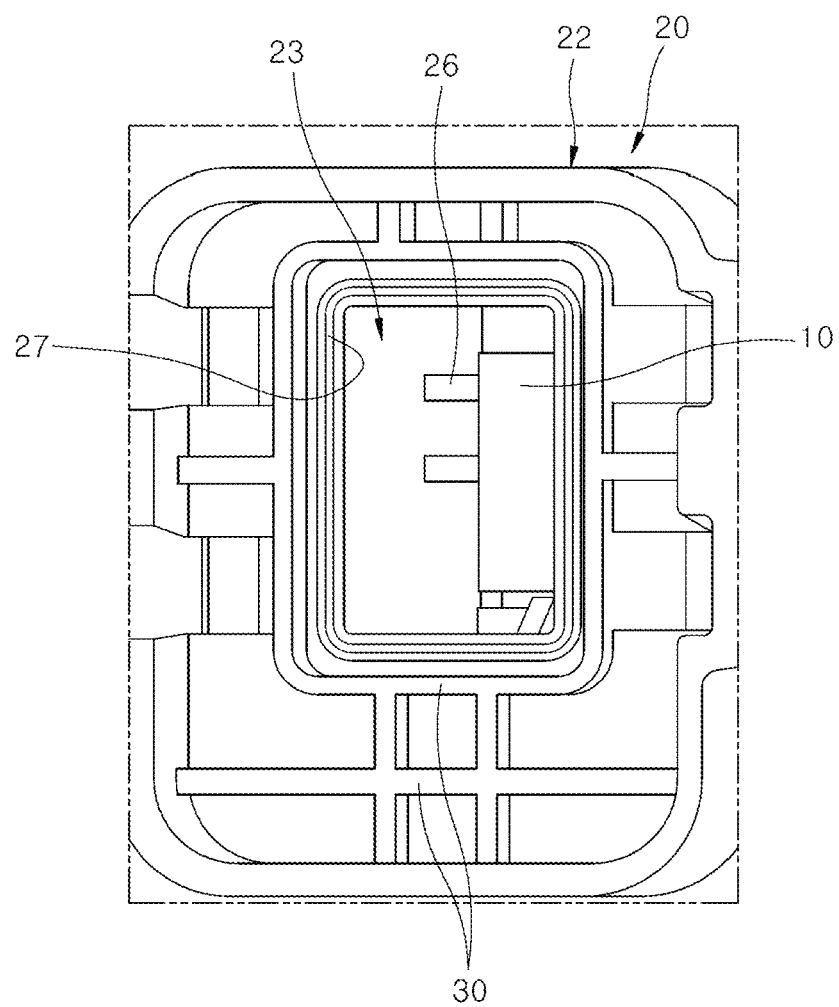
FIG. 9 is a perspective view illustrating the sensor element installed in a mounting depression in accordance with the embodiment of the present invention.
Figure 10:
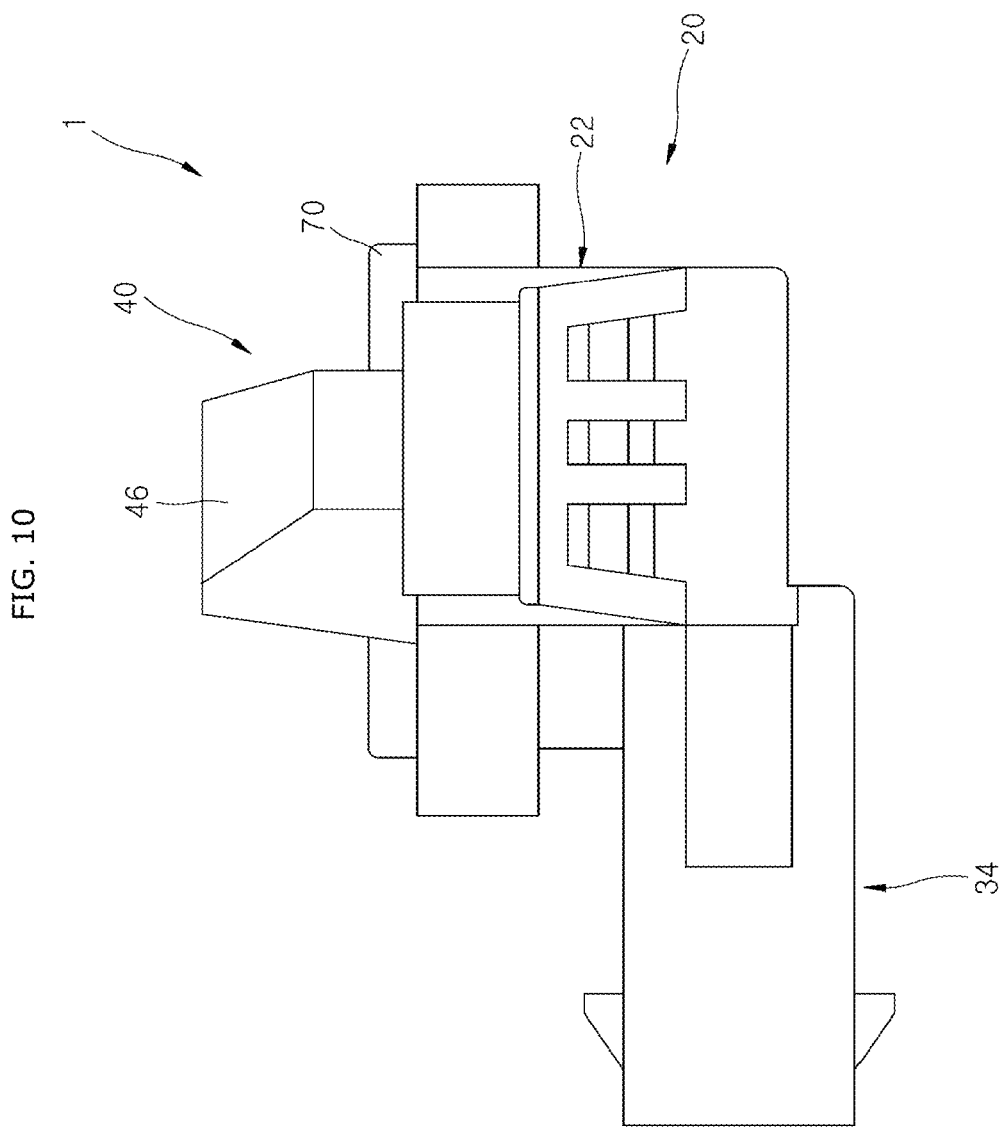
FIG. 10 is a side view illustrating the pressure sensing apparatus in accordance with the embodiment of the present invention.

FIG. 1 is an exploded perspective view schematically illustrating a structure of a pressure sensing apparatus for a vehicle in accordance with an embodiment of the present invention. FIG. 2 is a perspective view illustrating the external shape of the pressure sensing apparatus in accordance with the embodiment of the present invention. FIG. 3 is a perspective view illustrating an elastic pressing unit installed in a cover unit in accordance with the embodiment of the present invention. FIG. 4 is a plan view illustrating a housing unit in accordance with the embodiment of the present invention. FIG. 5 is a plan view illustrating a sensor element installed in the housing unit in accordance with the embodiment of the present invention. FIG. 6 is a perspective view illustrating a rear side of the pressure sensing apparatus for the vehicle in accordance with the embodiment of the present invention. FIGS. 7 and 8 are sectional views schematically illustrating the pressure sensing apparatus in accordance with the embodiment of the present invention. FIG. 9 is a perspective view illustrating the sensor element installed in a mounting depression in accordance with the embodiment of the present invention. FIG. 10 is a side view illustrating the pressure sensing apparatus in accordance with the embodiment of the present invention.

As shown in FIGS. 1, 3, 8 and 10, the pressure sensing apparatus 1 in accordance with the embodiment of the present invention includes a sensor element 10, a housing unit 20, a cover unit 40, an elastic pressing unit 50, an inner elastic part 60 and an outer elastic part 70.

The present invention provides the pressure sensing apparatus 1 having a structure in which the sensor element 10 is brought into contact with a terminal unit 24 by pressing the sensor element 10. Thanks to the structure in which the sensor element 10 is fixed to the terminal unit 24 of the housing unit 20 by pressing the sensor element 10, the sensor element 10 may be installed in the housing unit 20 without using a separate assembly part such as a PCB. Consequently, an assembly structure of the sensor element is simplified.

The sensor element 10 is a pressure sensor which measures a change in air pressure due to a vehicle collision. The sensor element 10 has two or more electrical contacts and comes into contact with the terminal unit 24 provided in the housing unit 20. The sensor element 10 according to the embodiment has a cuboid shape, and is inserted into a mounting depression 23 of a housing body 22 and brought into contact with the terminal unit 24.

As shown in FIGS. 2 to 7, the housing unit 20 allows the sensor element 10 to be seated thereinto, and includes the terminal unit 24 which is electrically coupled to the sensor element 10. The housing unit 20 is fixed to a vehicle body. The housing unit 20 in accordance with the embodiment includes the housing body 22, a stopper 30, a vehicle body mounting part 32 and a connector 34.

The pressure sensing apparatus 1 employs the housing unit 20 in which the vehicle body mounting part 32 is integrated with the connector 34. Therefore, when the pressure sensing apparatus 1 is installed in the vehicle body after the cover unit 40 has been assembled with the housing unit 20, the cover unit 40 and the sensor element 10 may be prevented or minimized from being affected by external vibration through a line coupled to the connector 34, etc.

The housing body 22 may be modified in various ways within the range of the technical idea in which it includes the mounting depression 23 into which the sensor element 10 is seated. The vehicle body mounting part 32 is coupled to each of opposite sides of the housing body 22 according to the embodiment, and the connector 34 is coupled to a lower end of a central portion of the housing body 22. The housing body 22 according to the embodiment includes the mounting depression 23, a sealing protrusion 27, the terminal unit 24, and a guide rib 26.

The mounting depression 23 is a depression formed to insert the sensor element 10 into the housing body 22. The sealing protrusion 27 protruding upward along a perimeter of the mounting depression 23 comes into contact with the inner elastic part 60 fixed to an inner surface of the cover unit 40. Therefore, the inner elastic part 60 that is an elastic body comes into close contact with the sealing protrusion 27, thus providing a sealing function.

The terminal unit 24 disposed on the bottom of the mounting depression 23 is formed of conductive material. The terminal unit 24 includes a round terminal 25 hemispherically protruding toward the sensor element 10, and protrudes into the mounting depression 23. Consequently, the sensor element 10 comes into contact with the round terminal 25 of the terminal unit 24, thus forming an electrical contact therebetween.

As shown in FIGS. 1, 4, 5 and 9, the guide rib 26 which guides movement of the sensor element 10 is provided in the mounting depression 23. The guide rib 26 may protrude into the mounting depression 23, and be formed in various shapes within the range of a technical idea in which it guides the movement of the sensor element 10 that comes into contact with the terminal unit 24. In an embodiment, the guide rib 26 is formed of a plurality of protrusions and protrudes into the mounting depression 23. The guide rib 26 may come into contact with a side surface of the sensor element 10 in contact with the terminal unit 24 or be spaced apart therefrom by a preset distance to guide the movement of the sensor element 10. Furthermore, the guide rib 26 prevents the sensor element 10 in contact with the terminal unit 24 from undesirably moving, and guides the sensor element 10 such that the sensor element 10 is stably installed.

As shown in FIGS. 1 and 9, the stopper 30 has the form of a protrusion which protrudes from the housing body 22 facing the cover unit 40 and supports the cover unit 40. In an embodiment, the stopper 30 includes a protrusion which forms a separate band-shaped flange around the periphery of sealing protrusion 27, and a grid protrusion which protrudes from a side surface of the housing body 22 facing the cover unit 40. The stopper 30 has the form of a protrusion which protrudes from the housing body 22 facing the cover unit 40. When the cover unit 40 is assembled with the housing unit 20, the stopper 30 supports the cover unit 40. Therefore, the sensor element 10 may be prevented from being excessively pressed by the elastic pressing unit 50.

The vehicle body mounting part 32 protrudes from each of the opposite sides of the housing body 22 and is fixed to the vehicle body. The vehicle body mounting part 32 according to an embodiment has a hole to be used to fix the vehicle body mounting part 32 to the vehicle body.

As shown in FIGS. 1 and 8, the connector 34 extends from the housing body 22, and includes therein a connector terminal 36 coupled with the terminal unit 24. The housing body 22, the vehicle body mounting part 32, and the connector 34 are integrally formed into a single body by injection molding.

As shown in FIGS. 1, 3 and 7, the cover unit 40 may be formed in various shapes within the range of a technical idea in which it is removably installed on the housing unit 20. In an embodiment, the cover unit 40 includes a cover body 42, a hook 44, and a protruding duct 46.

The cover body 42 coupled with the elastic pressing unit 50 is formed in plate shape. The elastic pressing unit 50 and the inner elastic part 60 are installed on a first side of the cover body 42 that faces the mounting depression 23. The outer elastic part 70 and the protruding duct 46 are installed on a second side of the cover body 42 that is opposite to the mounting depression 23. The cover body 42 covers an opening of the mounting depression 23 and comes into contact with the stopper 30.

The hook 44 extends from the cover body 42 and is coupled to the housing unit 20 in a fitting manner. A plurality of hooks 44 protruding from a peripheral edge of the cover body 42 toward the housing unit 20 are inserted into slots formed in the housing unit 20 and hooked thereto in a fitting manner.

The protruding duct 46 protrudes outward from the cover body 42 to form a path through which air flows, and has a duct shape. The protruding duct 46 in accordance with an embodiment has a shape protruding outward from the cover body 42, and has a shape in which only one side surface of the protruding duct 46 is open and an upper surface and the other side surfaces thereof are closed. The protruding duct 46 has a triangular cross-section and is formed such that only one side surface of the protruding duct 46 is open to form a path through which external air pressure moves.

A hole communicating with the interior of the protruding duct 46 is formed in the cover body 42 coupled with the protruding duct 46. The hole formed in the cover body 42 also communicates with an inner space of the elastic pressing unit 50.

Air pressure that moves through the protruding duct 46 moves to the sensor element 10 through the hole of the cover body 42 and the hole of the elastic pressing unit 50.

The cover unit 40 is formed by double injection molding with an elastic body that forms the elastic pressing unit 50, the inner elastic part 60 and the outer elastic part 70. The elastic body that is material of the elastic pressing unit 50, the inner elastic part 60 and the outer elastic part 70 is formed of material such as thermoplastic elastomer or rubber.

As shown in FIGS. 3 and 7, a first end of the elastic pressing unit 50 is coupled to the cover unit 40, and a second end thereof protrudes toward the sensor element 10 to press the sensor element 10. The elastic pressing unit 50 is formed of elastically deformable material. In the elastic pressing unit 50, the area of a pressing surface 52 facing the sensor element 10 is equal to or less than that of the sensor element 10 facing the pressing surface 52. The size of the pressing surface 52 of the elastic pressing unit 50 is equal to or less than that of the perimeter of the sensor element 10. Therefore, the pressing surface 52 may uniformly presses the sensor element 10 without excessively eccentrically pressing the sensor element 10. Consequently, the sensor element 10 is reliably connected to the round terminal 25 of the terminal unit 24, whereby the operational reliability of the pressure sensing apparatus 1 may be enhanced.

When the cover unit 40 is coupled to the housing unit 20, the elastic pressing unit 50 coupled to the cover unit 40 comes into close contact with the sensor element 10 to ensure an electrical contact between the sensor element 10 and the terminal unit 24 having a hemispherical protrusion structure.

The elastic pressing unit 50 in accordance with an embodiment is formed of an elastic body, has an empty space therein, and is formed in a shape protruding from the cover body 42. The hole of the cover body 42 and the inner space of the elastic pressing unit 50 communicate with each other. A hole is also formed in the pressing surface 52 of the elastic pressing unit 50 that faces the sensor element 10. Therefore, air pressure that moves through the protruding duct 46 moves into the elastic pressing unit 50 through the hole formed in the cover body 42, and thereafter, moves to the sensor element 10 through a connecting hole 54 formed in the elastic pressing unit 50.

In other words, the elastic pressing unit 50 has a structure with a hole to allow external pressure to be transmitted to the sensor element 10, and may be varied in shape or length by external force.

The inner elastic part 60 is fixed to a surface of the cover unit 40. When the cover unit 40 is coupled to the housing unit 20, the inner elastic part 60 comes into contact with the rectangular frame-shaped sealing protrusion 27 provided on the housing unit 20, thus providing a sealing function. The inner elastic part 60 in accordance with an embodiment is an elastic body which forms a band-shaped flange around the periphery of the elastic pressing unit 50 and is fixed to an inner surface of the cover body 42.

As shown in FIGS. 1, 2 and 7, when the pressure sensing apparatus is installed in the vehicle body, the outer elastic part 70 may be compressed by the vehicle body, thus performing a sealing function. The outer elastic part 70 in accordance with an embodiment is an elastic body which forms a band-shaped flange around the periphery of the protruding duct 46 and is fixed to an outer surface of the cover body 42. The outer elastic part 70 is an elastic protrusion protruding in a rectangular frame shape, and is fixed to the outer surface of the cover body 42. Consequently, when the housing unit 20 is fixed to a portion of the vehicle body and the cover unit 40 along with the outer elastic part 70 is fixed to the housing unit 20, another portion of the vehicle body comes into contact with the outer elastic part 70, whereby the outer elastic part 70 may perform a sealing function.

Hereinafter, the operation of the pressure sensing apparatus 1 in accordance with an embodiment of the present invention will be described in detail with reference to the accompanying drawings.

The sensor element 10 is guided along the guide rib 26 and seated into the mounting depression 23. Here, the sensor element 10 is electrically coupled with the terminal unit 24 by coming into contact with the round terminal 25 of the terminal unit 24.

The hook 44 of the cover unit 40 is coupled to the housing unit 20, and then the cover unit 40 covers the opening of the mounting depression 23. The elastic pressing unit 50 coupled to the cover body 42 presses the sensor element 10 in a direction in which the sensor element 10 comes into contact with the terminal unit 24.

The inner elastic part 60 coming into contact with the housing unit 20 along with the cover unit 40 comes into contact with the sealing protrusion of the housing unit 20, thus performing a sealing function. Consequently, external air of the housing part 20 is prevented from moving to the sensor element 10 through the inner elastic part 60, whereby the accuracy of the sensor element 10 may be improved.

Furthermore, the elastic pressing unit 50 along with the cover unit 40 presses the sensor element 10, whereby the electrical contact between the sensor element 10 and the terminal unit 24 is always achieved. Therefore, the sensor element 10 may be prevented from being spaced apart from the terminal unit 24 by external vibrations or the like.

In addition, because the area of the pressing surface 52 of the elastic pressing unit 50 that presses the sensor element 10 is equal to or less than that of an upper surface of the sensor element 10 that faces the elastic pressing unit 50, excessive force is prevented from being eccentrically transmitted to one side of the sensor element 10.

The cover body 42 comes into contact with the stopper 30 having a protrusion shape protruding from the housing body 22, thus being prevented from moving by a set value or more. Consequently, the sensor element 10 may be prevented from being excessively pressed by the elastic pressing unit 50 moving along with the cover body 42. Furthermore, when the pressure sensing apparatus 1 is installed in the vehicle body, the outer elastic part 70 is brought into contact with the vehicle body and compressed by the vehicle body. Thus, the outer elastic part 70 may perform a sealing function.

When a shock wave, which is a change in air pressure, occurs during a vehicle collision, the shock wave is moved along the internal space of the protruding duct 46 and transmitted to the sensor element 10 through the hole of the cover body 42 and the connecting hole 54 of the elastic pressing unit 50. The sensor element 10 measures a change in air pressure and transmits the measured value to a controller of the vehicle to allow an airbag to be deployed.

As described above, in accordance with the present invention, when the cover unit 40 is coupled to the housing unit 20, the elastic pressing unit 50 presses the sensor element 10. Therefore, the sensor element 10 is stably installed without using a separate PCB, whereby the number of production processes may be reduced.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A pressure sensing apparatus for a vehicle, comprising:
   a housing configured to be fixed to a vehicle body;
   a sensor element configured to measure a change in air pressure caused in response to a collision of the vehicle;
   a mounting depression formed in the housing and configured to receive the sensor element;
   an electrical terminal coupled to a bottom of the mounting depression and electrically connected to the sensor element received in the mounting depression;
   a cover mechanically coupled to the housing to cover the mounting depression of the housing, the cover comprising an air conduit configured to allow air movement caused by the collision to reach the sensor element; and
   a single body elastic member disposed between the housing and the cover and configured to seal the mounting depression,
   wherein the single body elastic member comprises an elastic column received in the mounting depression and extending between a first end connected to the cover and a second end contacting and pressing the sensor element, the elastic column comprising a hole formed therethrough to extend from the first end to the second end and being in fluid communication with the air conduit,
   wherein the single body elastic member further comprises a flange extending from the first end and interposed between the cover and the housing to provide sealing between the cover and the housing.

2. The apparatus according to claim 1, wherein the housing comprises:
   a housing body;
   a vehicle body mounting part protruding from each of opposite sides of the housing body and configured to be fixed to the vehicle body;
   a connector housing extending from the housing body; and
   a connector inside the connector housing and connected to the electrical terminal.

3. The apparatus according to claim 2, wherein the housing body further includes a guide rib protruding into the mounting depression and configured to restrain movement of the sensor element in the mounting depression.

4. The apparatus according to claim 2, wherein the housing further comprises a stopper protruding from the housing body facing the cover, and configured to support the cover.

5. The apparatus according to claim 2, wherein the vehicle body mounting part is integrated with the connector.

6. The apparatus according to claim 2, wherein the cover comprises:
   a cover body;
   a hook extending from the cover body and coupled to the housing; and
   a protruding duct extending outward from the cover body and providing a path for air.

7. The apparatus according to claim 6, further comprising:
   an outer elastic flange disposed around a periphery of the protruding duct, and formed of an elastic body fixed to an outer surface of the cover body.

8. The apparatus according to claim 1, wherein the housing further comprises a sealing protrusion protruding along a perimeter of the mounting depression and contacting the flange of the single body elastic member.

* * * * *